United States Patent [19]
Becker

[11] 4,089,095
[45] May 16, 1978

[54] SEAL MEANS FOR A SELF-ALIGNING BEARING AND METHOD OF MAKING THE SAME

[75] Inventor: Manfred E. Becker, Newington, Conn.

[73] Assignee: Textron Inc., Providence, R.I.

[21] Appl. No.: 758,402

[22] Filed: Jan. 11, 1977

[51] Int. Cl.$^2$ .............................................. B21D 53/10
[52] U.S. Cl. ................................................ 29/149.5 B
[58] Field of Search .................... 29/149.5 B, 148.4 S, 29/149.5 MN, 149.5 S, 149.5 DD, 149.5 R

[56] References Cited
U.S. PATENT DOCUMENTS

| | | | |
|---|---|---|---|
| 3,243,212 | 3/1966 | May .............................. | 29/149.5 B X |
| 3,528,710 | 9/1970 | Roesner et al. .............. | 29/149.5 B X |
| 3,662,462 | 5/1972 | Shiflet ............................ | 29/149.5 B |

*Primary Examiner*—Milton S. Mehr
*Attorney, Agent, or Firm*—Hopgood, Calimafde, Kalil, Blaustein & Lieberman

[57] ABSTRACT

The invention contemplates elastomeric-seal application to the so-called plain-spherical variety of self-aligning bearing wherein the outer ring is the product of a swaging operation which causes it to conform its cylindrical bore to a spherical surface at sliding interface with the spherical convex outer surface of an inner-bearing member. Specifically, in the machining of the swaged ring to its ultimate O.D. and other specified dimensions, a deformable axially extending lip is created, in conjunction with an undercut counterbore, at the axial end to be sealed; an elastomeric O-ring is fitted to the counterbore, and the lip is coined-over into retaining and preloading relation with the O-ring.

16 Claims, 5 Drawing Figures

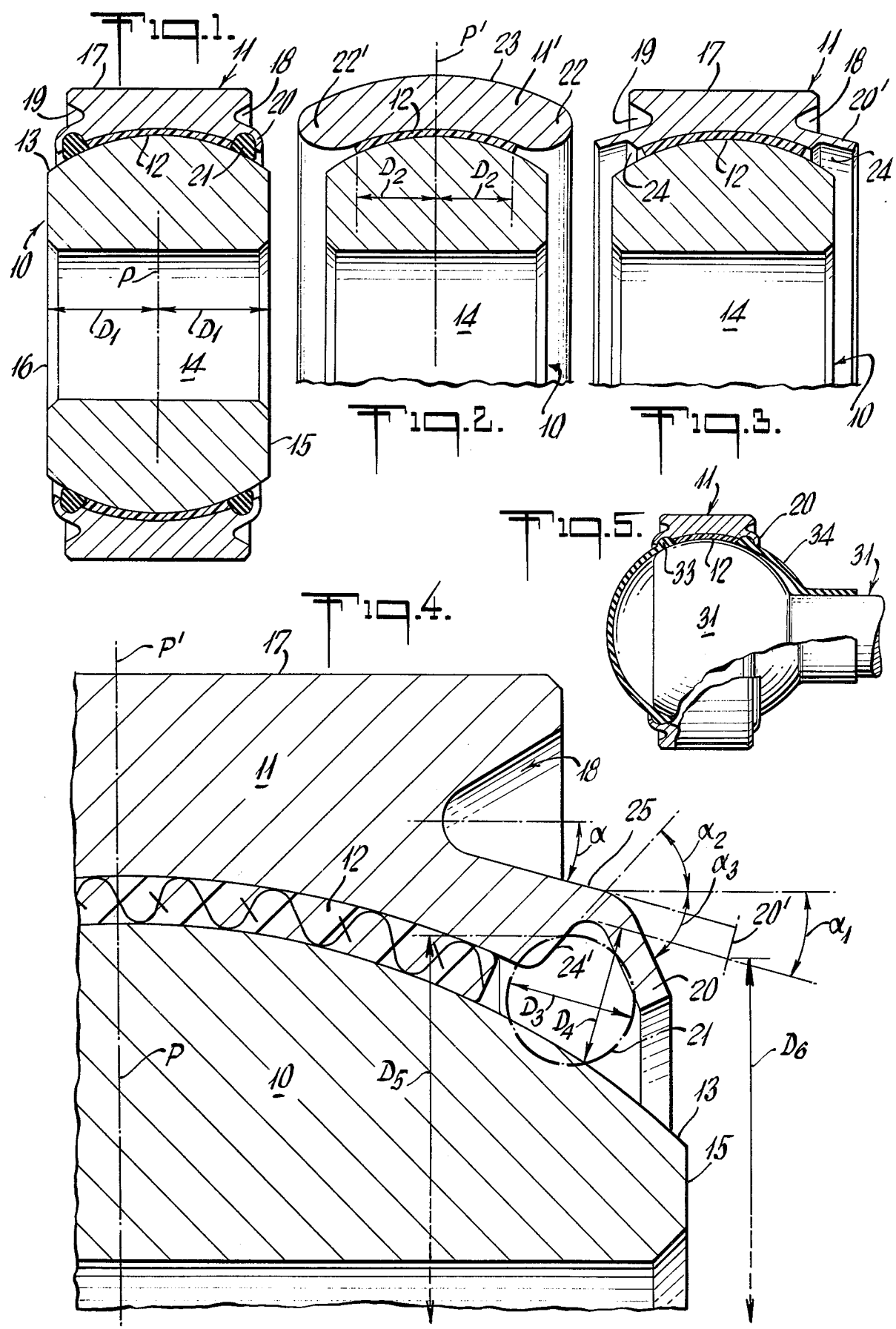

SEAL MEANS FOR A SELF-ALIGNING BEARING AND METHOD OF MAKING THE SAME

This invention relates to seal means for a self-aligning bearing and will be described in connection with that variety of plain-spherical bearing in which the outer ring is the product of swaging into spherical sliding interface relation with an inner bearing member having a spherical outer surface at such interface.

In bearings of the character indicated, it is important to maintain the integrity of the surfaces which slidably engage at the bearing interface, i.e., the zone of self-aligning coaction between an inner bearing member and an outer-ring member. Often such bearings incorporate a liner of low-friction material, such as a low-friction fabric, impregnated with a hardenable material. Corrosive and abrasive environments can take premature toll of such bearings, and to date seal measures have been less than satisfactory. Generally speaking, seals are provided as separate metal-reinforced subassemblies, having snap-fit to the outer-ring member and presenting an elastomeric element for resilient contact with the spherical convex outer surface of the inner-bearing member. It is an altogether too-frequent fact of life that such seals can "pop out" of assembled relation to the ring, particularly under load and in the environment which they are intended to seal from the bearing interface. Moreover, their very nature, as subassemblies, dictates an undesirable element of cost, precision-fit, and assembly.

It is, accordingly, an object of the invention to provide an improved seal and seal technique, for bearings of the character indicated.

A specific object is to achieve the above objects with a structure requiring no more metal than required for normal plain-spherical-bearing manufacture.

Another specific object is to achieve the above objects with a structure in which an elastomeric seal ring, such as an O-ring, is the only added structural element.

A further object is to achieve the foregoing objects with a construction which is inherently self-retaining of the assembled elastomeric seal ring.

A general object is to achieve these objects with a structure of inherent low cost and great sealing effectiveness, and which has long life and reliability hitherto unavailable for hostile-environment application. Other objects and various further features of novelty and invention will be pointed out or will occur to those skilled in the art from a reading of the following specification, in conjunction with the accompanying drawings. In said drawings, which show, for illustrative purposes only, a preferred form and method of the invention:

FIG. 1 is a vertical sectional view through a plain-spherical bearing incorporating end seals of the invention;

FIGS. 2 and 3 are fragmentary views as in FIG. 1, to show different stages in the course of practicing the method of the invention;

FIG. 4 is an enlarged fragmentary sectional view, to show structural relationships at one corner of FIG. 1; and FIG. 5 is a fragmentary view in partial section to show a modification.

As indicated generally above, the invention has particular application to plain-spherical bearings of the type which employ a swaging operation to convert, to spherical-concave, the cylindrical bore of a deformable outer-ring member. Such bearings, wherein the outer-ring bore is equipped with a bonded liner of low-friction fabric material, are the subject of Litsky U.S. Pat. No. 3,126,613, to which reference is made for greater detail. It suffices in connection with the present disclosure to identify in FIG. 1 an inner-ring member or "ball" 10 and an outer-ring member 11 having a low-friction liner 12 bonded to its bore. The fabric of liner 12 may be of woven, braided or knitted construction, employing filaments of low-friction material such as tetrafluoroethylene (TFE) and high-strength, high-temperature resistant, bondable filaments such as the DuPont product known as Nomex; and the fabric and its bonding may rely upon a phenolic, epoxy or other hardenable impregnant, cured to permanent hardness.

The inner-bearing member 10 is shown as a ring with a convex spherical outer surface 13 which is relied upon to establish the sliding interface of the bearing. Ring 10 has a cylindrical mounting bore 14 which extends between chamfers at like parallel end faces 15–16. The end faces 15–16 are at equal and symmetrical axial offsets $D_1$ from a central radial plane P which includes the full great circle of the sphere of surface 13.

The outer-ring member 11 is finished to an outer cylindrical surface 17 for ultimate mounting reception in a bore, as for example the bore of a so-called rod end. And each of the end faces of member 11 is shown with a circumferentially continuous groove 18 (19), to permit spun outward deformation of a lip, for bearing retention in the rod end.

In accordance with a feature of the invention, one or both of the end faces of the outer-ring member 11 are additionally characterized by a retaining lip 20 at an undercut counterbore, and an elastomeric ring 21 is retained by the lip 20, in resilient circumferentially continuous sealing contact with the convex spherical surface 13. When the outer-ring member 11 is a swaged product, it is by nature deformable, and therefore the lip 20 may be initially more axially projecting, in readiness for insertion of the elastomeric ring 21, whereupon permanently retained assembly of the elastomeric ring is assured by a coining of lip 20 into the position shown in FIG. 1, as will be more clear from an illustrative description of the manufacture of outer-ring member 11.

As previously indicated, the outer-ring member 11 is initially a blank 11' of excessive bulk and it has a cylindrical bore into which liner 12 is set and at least partially cured, prior to assembly into tangent contact with the inner-ring member 10, tangency being at the plane P. The swaging step is then performed, causing the blank 11' and its liner 12 to develop a concave spherical bore at the region of interface with the convex spherical surface 13. Care is taken, through initial liner placement, that the axial ends of liner 12, after swaging deformation (see FIG. 2), are symmetrically disposed at substantially equal offsets $D_2$ on opposite sides of the central radial plane P' which includes the full great circle of the concave spherical bearing-interface surface of the swaged outer-ring blank 11'. The parts then have the relation shown in FIG. 2, with excessive section bulk projecting axially (at 22–22') beyond the axial ends of inner-ring member 10, and with excessive central bulk extending in a bulging arc 23 radially outward of the ultimately cylindrical outer suface 17.

Ordinarily, the excessive bulk at 22–22'–23 is trimmed off in machining operations, whereby the outer cylindrical surface 17 is defined between parallel end faces, optionally grooved at 18–19, depending upon installation-mounting requirements. However, in accordance with a feature of the invention, I alter the machining operations as to define integrally connected axially projecting lip formations 20', at undercut counterbores 24 at the respective axial ends of outer-ring member 11. The overall resulting sectional appearance is shown in FIG. 3, and also in much greater detail in FIG. 4, where a machined lip 20' is presented in phantom outline. The lip has a machined outer profile 25 which may be cylindrical but which preferably is frusto-conical, being radially convergent in the axially outer direction, at a slope $\alpha1$ with respect to the axis of outer-ring member 11; generally, the slope $\alpha1$ is in the range of 10° to 20°, being shown at the preferred slope of substantially 15°. The projecting outer end of counterbore 24 is similarly machined to substantially the slope $\alpha1$, as also shown by legend in FIG. 4, and the effective axial extent of counterbore 24 is such as to overlap the axially outer limit of the inserted O-ring body. In FIG. 4, the axially inner end of the counterbore is shown to include a second frusto-conical surface 24', which flares radially outward in the axially outward direction and from a location closely adjacent liner 12, as shown; the angle of such flare is designated $\alpha_2$ with respect to the axis of outer-ring member 11, and this angle $\alpha_2$ is generally in the range 40° to 50° with respect to the outer-ring axis, being preferably about 45°.

In FIG. 4, the local body section of the elastomeric O-ring 21 is shown in phantom outline for its unstressed condition. In this unstressed condition, the body-section $D_3$ may substantially match the effective radial clearance $D_4$ of counterbore 24 with respect to the adjacent region of initial seal-ring contact with the convex spherical surface 13. Also, the maximum unstressed diameter $D_5$ of seal ring 21 is preferably greater than the minimum machined diameter $D_6$ of the counterbore 24, thereby establishing a light interference relation therewith, for initial lip retention of seal ring 21, in well displaced axial entry into counterbore 24; with this relationship, seal ring 21 is held near the inner end of counterbore 24 and is eventually driven into compressed abutment with the inner end surface 24' in the course of a coining deformation of lip 20 into the position shown in solid outline in FIG. 4. In the coining operation, lip 20 assumes a more sharply convergent relation to the outer-ring axis, at a slope angle $\alpha_3$ which is in the range of 50° to 85°, and preferably 60° to 65°.

The maximum unstressed diameter $D_5$ of seal ring 21 has been indicated preferably to exceed the insertion restriction $D_6$, but such limitation will be seen not adversely to affect the selective availability of a range of ultimate resilient preload conditions for seal contact with surface 13. For example, the unstressed outer diameter $D_5$ and body-section diameter $D_3$ may be selected such that ring 21 develops initial contact with surface 13 at an axial location which is substantially offset from the ultimately secured location of ring 21. The greater this offset, the more the seal-contact preload, for a given angle $\alpha_3$ of coined lip deformation. But, whatever the selected extent of seal-contact preload, the seal ring 21 will necessarily assume a positively retained position and shape of equilibrium support, provided by compressional contact with ring 21 via the three surfaces 24'-13-24 (deformed position). Ring-positioning stability derives from the substantially equal angular spacing with which these three surfaces contact the body section of ring 21.

It will be seen that I have described a seal construction and method meeting all stated objects. Tests under load have established its superiority to past constructions. It not only represents the barest minimum of cost and complexity, but also offers a range of ultimate preloaded-seal relationships, available through selection of seal-ring dimensional parameters $D_3$ and $D_5$, and through selection of the coined-lip angle $\alpha_3$; elastomeric stiffness provides another dimension of selective control of seal action, highly satisfactory results being thus far obtained for a sealing O-ring at 21 of 0.712-inch inside diameter, of body section diameter $D_3=0.040$ inch, and of red silicone rubber of 70A durometer. Economy of outer-ring material and machining is achieved by construction of the outer lip surface 25 in common with the radially inner wall surface of the mounting groove 18, both being shown as one, having the slope $\alpha_1$.

The coining operation on lip 20 will be understood to be illustrative. For example, the coined angle $\alpha_3$ may be the product of more than one coining operation wherein a first coining step to a less severe angle $\alpha_3$ may establish a given preloaded seal-contact relation which lends itself to direct pressure evaluation, so that if seal pressure proves to be less than specified, one or more simple coining operations to produce steepening angle increments at $\alpha_3$ will permit achievement of the desired pressure, without establishing an overloaded pressure relation.

While the invention has been described in detail for the preferred form and method, it will be understood that modifications may be made without departing from the scope of the invention. For example, the machined lip 20' will be seen to define (with adjacent spherical surface 21 and the nearby end of lining 12) a cavity adapted to in-situ molding of an elastomeric seal ring, which would of course then not be an O-ring; nevertheless, a controllable and predetermined seal-contact pressure would again be established by the coined deformation of lip 20. Still further, the undercut counterbore 24 may be machined to its ultimately desired profile (e.g., solid-outline shape of FIG. 4), and the O-ring or other elastomeric seal member could be inserted by suitable tooling which relies upon such gross misalignment of the axes of rings 10–11 as to locally place the undercut counterbore 24 beyond the adjacent axial end 15 of inner ring 10, such local placement being rotationally gyrated about the inner-ring axis in the course of O-ring insertion.

Throughout the foregoing application, the expression "coining" will be understood to be illustrative of but one technique for deforming the deformable lip 20, in that other techniques such as rolling may be preferred, depending on considerations of size and materials; and of course the lip 20 may be designed to extend into such close proximity to the adjacent convex spherical surface 13 as may be desired for particular purposes. Also, the yieldable seal member which illustratively appears as an O-ring may be of other sectional configuration, or of flexibly yieldable material other than elastomeric. Further, as illustrated in FIG. 5, the flexible seal ring may be the circumferential rim of a boot member.

Specifically, FIG. 5 shows application of the invention in the situation in which the inner member 30 is a rod-end member having a spherical convex surface or "ball" 31 to which the outer ring 11 is fitted, all in accordance with previous description. The "ball" end of the inner 30 is closed by a boot member 32, the circumferential rim 33 of which meets the substantial specification and function of the O-ring 21 previously discussed, being retained by the applicable coined or rolled lip 20.

In like fashion, another boot member 34, centrally apertured for sealing contact with the shank of rod-end member 30, has a circumferential bead retained by the other coined or rolled lip 20.

I claim:

1. The method of making a seal for a bearing wherein the concave inner surface of an outer-ring member has self-alignment fit to the spherical convex outer surface of an inner-ring member, which method comprises selecting a deformable generally cylindrical annulus of bore diameter to fit the spherical inner-ring member, swaging the annulus in assembled relation to the inner-ring member, whereby the bore of the annulus is substantially conformed to and retained at a bearing interface with the spherical surface of the inner-ring member, machining the deformed annulus, such machining including the formation of a relatively thin circumferentially continuous axially projecting lip at a counterbore which extends axially inwardly substantially to the adjacent axial limit of the concave-to-convex bearing interface, said lip also being in circumferentially continuous radially offset clearance with respect to said convex spherical surface, selecting and fitting an elastomeric O-ring between the lip and the inner ring at said clearance, and deforming the lip axially and radially inwardly into retaining engagement with the O-ring.

2. The method of claim 1, in which said lip-deforming step is a coining operation.

3. The method of claim 1, in which the lip-machining step is one of two, producing like but oppositely projecting lips at the respective axial ends of the deformable annulus, wherein another elastomeric O-ring is selected and fitted between the second lip and the inner ring, and wherein the second lip is similarly deformed into retaining engagement with the O-ring.

4. The method of claim 1, in which the lip-machining step produces an undercut contour in the lip counterbore, the O-ring unstressed outer diameter being selected for interference with the axially outer end of the undercut counterbore, whereby the fitted O-ring is at least lightly retained prior to and during the lip-deforming step.

5. The method of claim 4, in which the undercut contour is substantially frusto-conical, with an undeformed slope which converges radially in the axially outward direction.

6. The method of claim 5, in which the convergent slope is in the range of 10° to 20° with respect to the axis of the deformable annulus.

7. The method of claim 5, in which the convergent slope is substantially 15° with respect to the axis of the deformable annulus.

8. The method of claim 5, in which the inner end of the counterbore is characterized by a further contour which is substantially frusto-conical, with an undeformed slope which flares radially outwardly in the axially outward direction.

9. The method claim 8, in which the outwardly flaring slope is in the range of 40° to 50° with respect to the axis of the deformable annulus.

10. The method of claim 8, in which the outwardly flaring slope is substantially 45° with respect to the axis of the deformable annulus.

11. The method of claim 1, in which the machining step further includes the formation of an axially outwardly open circumferentially continuous groove in the axial end of the deformable annulus, such groove formations being radially outward of the lip formation.

12. The method of claim 11, in which the machining step produces the radially outer surface of the lip formation and the radially inner surface of the groove formation has a single smoothly continuous frusto-conical surface which converges radially in the axially outward direction.

13. The method of claim 11, in which the single smoothly continuous frusto-conical surface has a convergent slope in the range of 10° to 20° with respect to the axis of the deformable annulus.

14. The method of claim 11, in which the single smoothly continuous frusto-conical surface is substantially 15° with respect to the axis of the deformable annulus.

15. The method of claim 1, in which said lip-deforming step is a rolling operation.

16. The method of making a seal for a bearing wherein the concave inner surface of an outer-ring member has self-alignment fit to the spherical convex outer surface of an inner-ring member, which method comprises selecting an annulus of deformable material and forming the same with a concave spherical surface for self-aligning circumferentially extensive sliding fit to the convex spherical surface of the inner-ring member, machining the thus-formed annulus, such machining including the formation of a relatively thin circumferentially continuous axially projecting lip at a counterbore which extends axially inwardly substantially to the adjacent axial limit of the concave-to-convex bearing interface, said lip also being in circumferentially continuous radially offset clearance with respect to said convex spherical surface, selecting and fitting an elastomeric ring between the lip and the inner ring at said clearance, and deforming the lip axially and radially inwardly into retaining engagement with the ring.

* * * * *